US008068254B2

(12) United States Patent
Silverbrook

(10) Patent No.: US 8,068,254 B2
(45) Date of Patent: *Nov. 29, 2011

(54) MOBILE TELEPHONE WITH DETACHABLE PRINTING MECHANISM

(75) Inventor: Kia Silverbrook, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 2 days.

This patent is subject to a terminal disclaimer.

(21) Appl. No.: 12/493,212

(22) Filed: Jun. 28, 2009

(65) Prior Publication Data

US 2009/0264151 A1    Oct. 22, 2009

Related U.S. Application Data

(63) Continuation of application No. 11/635,526, filed on Dec. 8, 2006, now Pat. No. 7,564,580, which is a continuation of application No. 10/919,382, filed on Aug. 17, 2004, now Pat. No. 7,158,258, which is a continuation of application No. 10/659,022, filed on Sep. 11, 2003, now Pat. No. 7,092,130, which is a continuation of application No. 09/436,589, filed on Nov. 9, 1999, now Pat. No. 6,628,430.

(30) Foreign Application Priority Data

Nov. 9, 1998  (AU) .......................... PP7021

(51) Int. Cl.
  *G06K 15/10*  (2006.01)
(52) U.S. Cl. ........ 358/1.8; 358/1.15; 358/1.12; 358/1.9; 455/556.1; 347/2

(58) Field of Classification Search .................. 358/1.1, 358/1.8, 1.15, 1.14
See application file for complete search history.

(56) References Cited

U.S. PATENT DOCUMENTS

| | | | |
|---|---|---|---|
| 4,258,387 A | 3/1981 | Lemelson et al. |
| 4,829,324 A | 5/1989 | Drake et al. |
| 4,904,100 A | 2/1990 | Enix |
| 4,937,676 A | 6/1990 | Finelli et al. |
| 4,961,088 A | 10/1990 | Gilliland et al. |
| 5,144,340 A | 9/1992 | Hotomi et al. |
| 5,155,502 A | 10/1992 | Kimura et al. |
| 5,179,936 A | 1/1993 | O'Hara et al. |
| 5,294,782 A | 3/1994 | Kumar |
| 5,344,248 A | 9/1994 | Schoon et al. |
| 5,408,669 A | 4/1995 | Stewart et al. |
| 5,442,387 A | 8/1995 | Loofbourow et al. |
| 5,473,352 A | 12/1995 | Ishida |

(Continued)

FOREIGN PATENT DOCUMENTS

EP    0848540 A    6/1998

(Continued)

*Primary Examiner* — King Poon
*Assistant Examiner* — Iriana Cruz

(57) ABSTRACT

A mobile telephone comprises a support structure around which the mobile telephone is constructed; a camera device positioned on the support structure for electronically capturing and processing an image; a detachable printing mechanism; and a receptacle, defined in the support structure, for receiving therein the detachable printing mechanism. The detachable printing mechanism defines therethrough a print media feed path along which print media is fed for printing. The print media feed path extends from a first longitudinal side of the support structure through to a second longitudinal side of the support structure opposite the first longitudinal side.

5 Claims, 16 Drawing Sheets

U.S. PATENT DOCUMENTS

| | | | |
|---|---|---|---|
| 5,493,409 A | 2/1996 | Maeda et al. | |
| 5,520,470 A | 5/1996 | Willett | |
| 5,535,371 A | 7/1996 | Stewart et al. | |
| 5,559,932 A | 9/1996 | Machida et al. | |
| 5,623,581 A | 4/1997 | Attenberg | |
| 5,625,669 A | 4/1997 | McGregor et al. | |
| 5,633,667 A | 5/1997 | Miyazawa | |
| 5,647,484 A | 7/1997 | Fleming | |
| 5,664,013 A | 9/1997 | Rossi | |
| 5,889,597 A | 3/1999 | Ara et al. | |
| 5,893,037 A | 4/1999 | Reele et al. | |
| 5,946,473 A | 8/1999 | Lotspiech et al. | |
| 5,982,853 A | 11/1999 | Liebermann | |
| 6,048,269 A | 4/2000 | Burns et al. | |
| 6,049,450 A | 4/2000 | Cho et al. | |
| 6,064,492 A | 5/2000 | Eldridge et al. | |
| 6,069,711 A | 5/2000 | Iwata | |
| 6,075,882 A | 6/2000 | Mullins et al. | |
| 6,082,581 A | 7/2000 | Anderson et al. | |
| 6,091,514 A | 7/2000 | Hasegawa et al. | |
| 6,095,633 A | 8/2000 | Harshbarger et al. | |
| 6,115,837 A | 9/2000 | Nguyen et al. | |
| 6,116,715 A | 9/2000 | Lefebvre et al. | |
| 6,119,931 A | 9/2000 | Novogrod | |
| 6,126,268 A | 10/2000 | Askeland et al. | |
| 6,166,826 A | 12/2000 | Yokoyama | |
| 6,167,551 A | 12/2000 | Nguyen et al. | |
| 6,170,943 B1 | 1/2001 | Wen et al. | |
| 6,172,688 B1 | 1/2001 | Iwasaki et al. | |
| 6,219,227 B1 | 4/2001 | Trane | |
| 6,219,229 B1 | 4/2001 | Lee | |
| 6,234,389 B1 | 5/2001 | Valliani et al. | |
| 6,241,350 B1 | 6/2001 | Otsuka et al. | |
| 6,256,666 B1 | 7/2001 | Singhai | |
| 6,282,082 B1 | 8/2001 | Armitage et al. | |
| 6,293,469 B1 | 9/2001 | Masson et al. | |
| 6,325,488 B1 | 12/2001 | Beerling et al. | |
| 6,344,904 B1 | 2/2002 | Mercer | |
| 6,405,055 B1 | 6/2002 | Silverbrook | |
| 6,628,430 B1 | 9/2003 | Silverbrook et al. | |
| 6,667,759 B2 | 12/2003 | Gerszberg et al. | |
| 6,697,174 B2 | 2/2004 | Mercer | |
| 6,742,887 B2 | 6/2004 | Ando | |
| 6,835,135 B1 | 12/2004 | Silverbrook et al. | |
| 6,914,686 B2 | 7/2005 | Silverbrook et al. | |
| 6,915,140 B2 | 7/2005 | Silverbrook | |
| 6,981,765 B2 | 1/2006 | King et al. | |
| 6,999,206 B2 | 2/2006 | Silverbrook | |
| 7,018,294 B2 | 3/2006 | Silverbrook et al. | |
| 7,070,270 B2 | 7/2006 | King et al. | |
| 7,077,748 B2 | 7/2006 | Silverbrook et al. | |
| 7,079,292 B2 | 7/2006 | Silverbrook et al. | |
| 7,125,337 B2 | 10/2006 | Silverbrook | |
| 7,125,338 B2 | 10/2006 | Silverbrook | |
| 7,146,179 B2 | 12/2006 | Parulski et al. | |
| 7,158,258 B2 * | 1/2007 | Silverbrook | 358/1.8 |
| 7,249,839 B2 | 7/2007 | King et al. | |
| 7,255,646 B2 | 8/2007 | Silverbrook et al. | |
| 7,296,304 B2 | 11/2007 | Goldsborough | |
| 7,341,336 B2 | 3/2008 | King et al. | |
| 7,387,573 B2 | 6/2008 | Silverbrook et al. | |
| 7,430,067 B2 | 9/2008 | Silverbrook | |
| 7,453,586 B2 | 11/2008 | Silverbrook et al. | |
| 7,460,882 B2 | 12/2008 | Silverbrook | |
| 7,468,810 B2 | 12/2008 | Silverbrook | |
| 7,556,564 B2 | 7/2009 | Silverbrook | |
| 7,591,547 B2 | 9/2009 | King et al. | |
| 7,609,410 B2 | 10/2009 | Lapstun et al. | |
| 7,654,905 B2 | 2/2010 | Silverbrook | |
| 7,784,931 B2 | 8/2010 | King et al. | |
| 2004/0070662 A1 | 4/2004 | Shimoda | |
| 2004/0252332 A1 | 12/2004 | McCoog et al. | |
| 2006/0133738 A1 | 6/2006 | Marcinkiewicz et al. | |
| 2009/0029732 A1 | 1/2009 | Silverbrook | |
| 2009/0291708 A1 | 11/2009 | Silverbrook | |
| 2010/0002062 A1 | 1/2010 | King et al. | |

FOREIGN PATENT DOCUMENTS

| | | |
|---|---|---|
| JP | 60-204361 | 10/1985 |
| JP | 02-30543 | 1/1990 |
| JP | 03-14879 | 1/1991 |
| JP | 04-1051 | 1/1992 |
| JP | 04-105113 | 4/1992 |
| JP | 04-200184 | 7/1992 |
| JP | 04-286444 | 10/1992 |
| JP | 05-16377 | 1/1993 |
| JP | 5-64045 | 3/1993 |
| JP | 05-201081 | 8/1993 |
| JP | 05-330150 | 12/1993 |
| JP | 06-37944 | 2/1994 |
| JP | 06-149051 | 5/1994 |
| JP | 06-183117 | 7/1994 |
| JP | 07-108688 | 4/1995 |
| JP | 08-79417 | 3/1996 |
| JP | 08-90879 | 4/1996 |
| JP | 08-118653 | 5/1996 |
| JP | 08-224730 | 9/1996 |
| JP | 09-036941 | 2/1997 |
| JP | 09-113990 A | 5/1997 |
| JP | 09-116843 | 5/1997 |
| JP | 09-123474 | 5/1997 |
| JP | 09-135316 | 5/1997 |
| JP | 09-187960 | 7/1997 |
| JP | 09-267487 | 10/1997 |
| JP | 10-65780 | 3/1998 |
| JP | 10-112855 | 4/1998 |
| JP | 10-126728 | 5/1998 |
| JP | 10-164538 | 6/1998 |
| JP | 09-116843 | 12/1998 |
| JP | 2-302181 | 7/2000 |
| WO | WO 96/32274 | 10/1996 |
| WO | WO 97/04353 A | 2/1997 |
| WO | WO 97/50243 A | 12/1997 |

* cited by examiner

MOBILE TELEPHONE WITH DETACHABLE PRINTING MECHANISM

CROSS-REFERENCE TO RELATED APPLICATIONS

This application is a Continuation of U.S. Ser. No. 11/635,526 filed Dec. 8, 2006, which is a Continuation of U.S. Ser. No. 10/919,382 filed on Aug. 17, 2004, now issued U.S. Pat. No. 7,158,258, which is a Continuation of U.S. Ser. No. 10/659,022 filed Sep. 11, 2003, now issued U.S. Pat. No. 7,092,130, which is a Continuation of U.S. Ser. No. 09/436,589, filed on Nov. 9, 1999, now issued U.S. Pat. No. 6,628,430 all of which are herein incorporated by reference.

FIELD OF THE INVENTION

The present invention relates to printing systems and more particularly to a handheld mobile communications device having a detachable printing mechanism.

The invention has been developed primarily for use with ultra compact mobile phones such as Personal Handyphone System (PHS) phones or other close network cellular devices. However, it will be appreciated by those skilled in the art, that the invention is equally applicable to all other types of hand held mobile phones including existing Global System for Mobile communication (GSM) phones, the proposed new General packet radio service (GPRS) and Wideband Code-Division Multiple Access (WCDMA) phones, satellite phones and the like.

SUMMARY OF THE INVENTION

According to one aspect of the present disclosure, a mobile telephone comprises a support structure around which the mobile telephone is constructed; a camera device positioned on the support structure for electronically capturing and processing an image; a detachable printing mechanism; and a receptacle, defined in the support structure, for receiving therein the detachable printing mechanism. The detachable printing mechanism defines therethrough a print media feed path along which print media is fed for printing. The print media feed path extends from a first longitudinal side of the support structure through to a second longitudinal side of the support structure opposite the first longitudinal side.

BRIEF DESCRIPTION OF THE DRAWINGS

A preferred embodiment of the invention will now be described, by way of example only, with reference to the accompanying drawings in which.

DETAILED DESCRIPTION OF THE INVENTION

In the preferred embodiment illustrated, there is provided a mobile phone having an internal printer which includes a separately detachable printhead and ink supply module. The printer phone can be produced at or close to a standard size phone for any system including PHS, GSM and GPRS, thereby conferring a higher level of convenience during operation.

Figure 1:
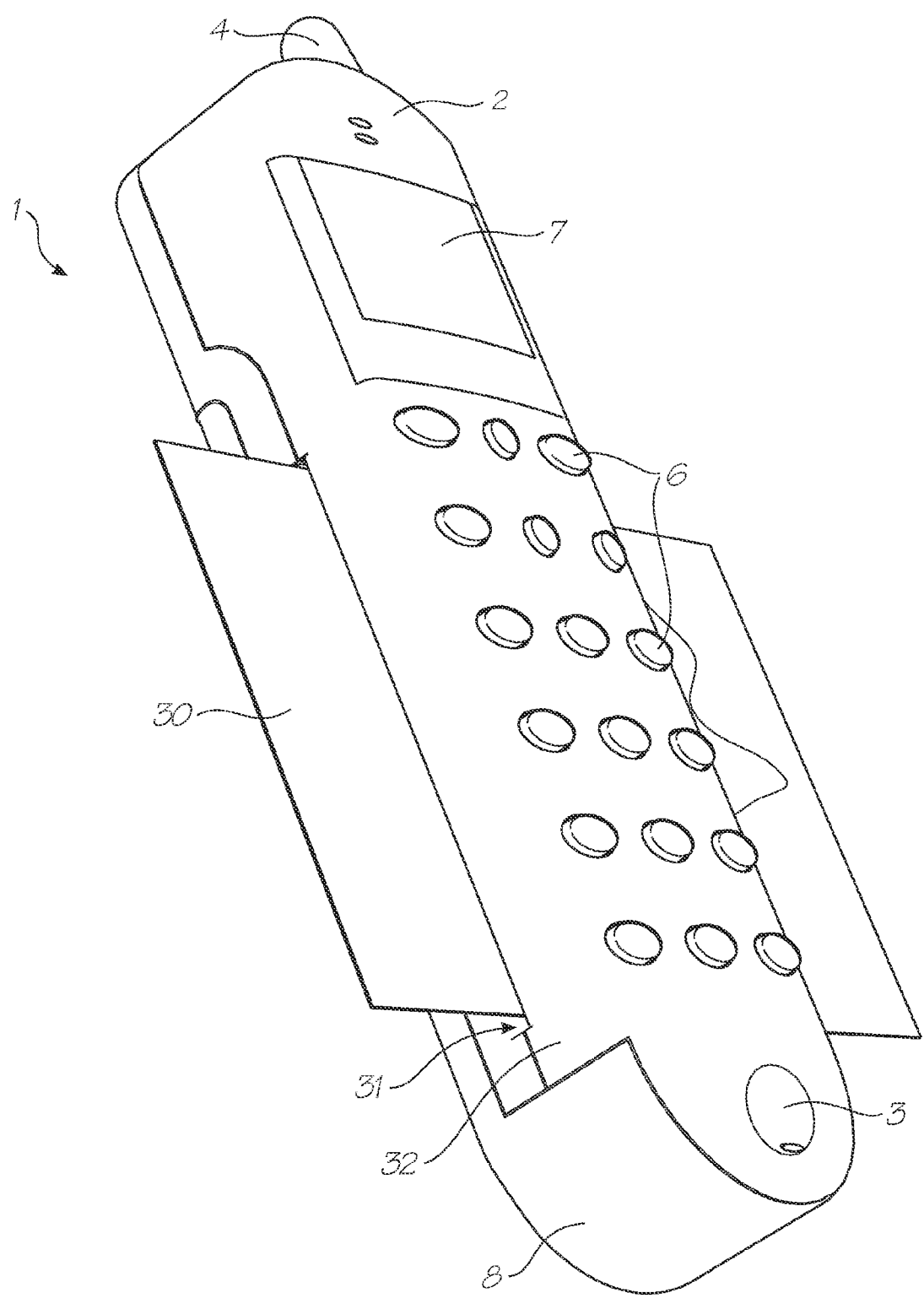
FIG. 1 is a front perspective view of a first embodiment printer phone in accordance with the invention.
Figure 2:
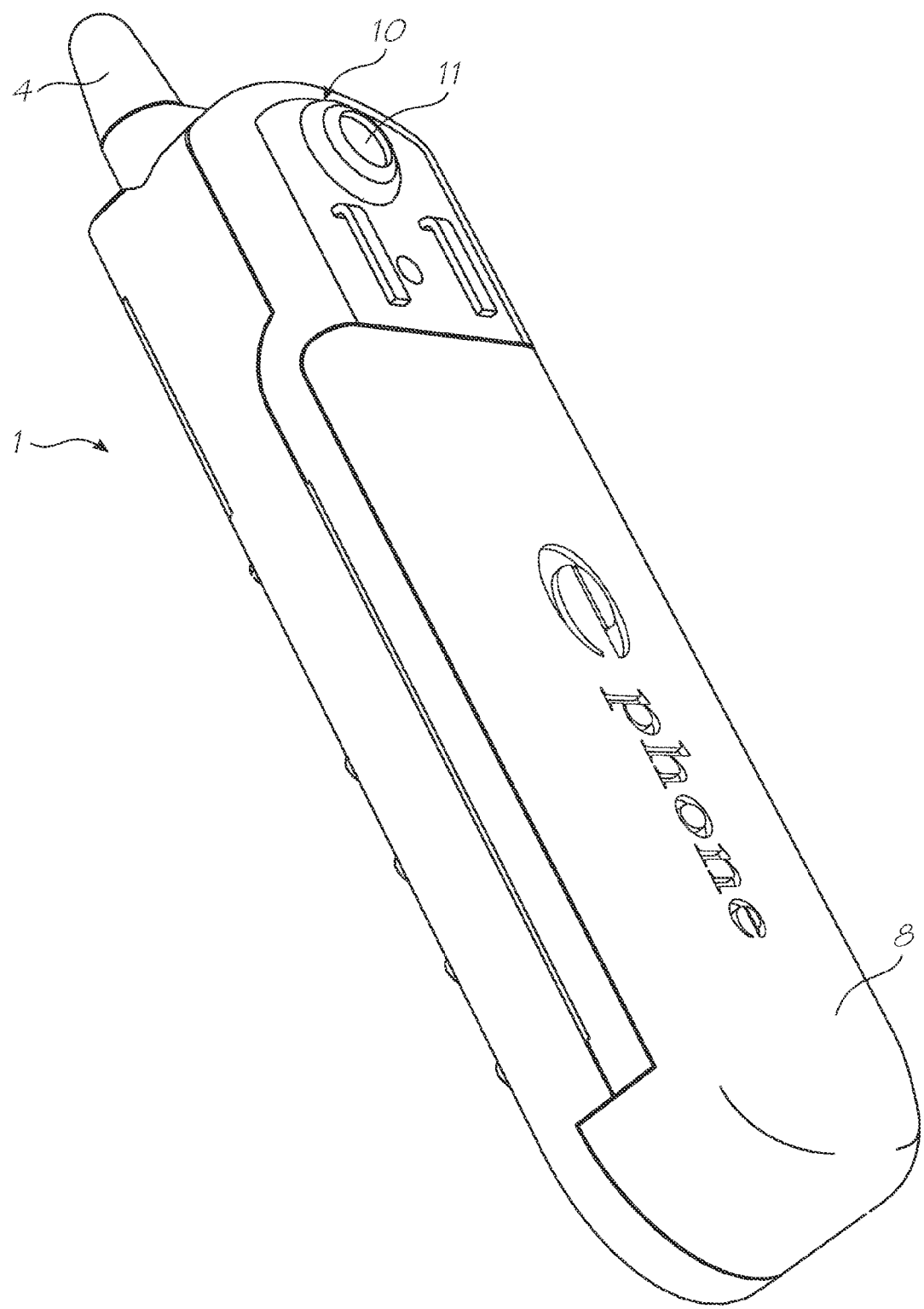
FIG. 2 is a rear perspective view of the phone shown in FIG. 1.
Figure 3:
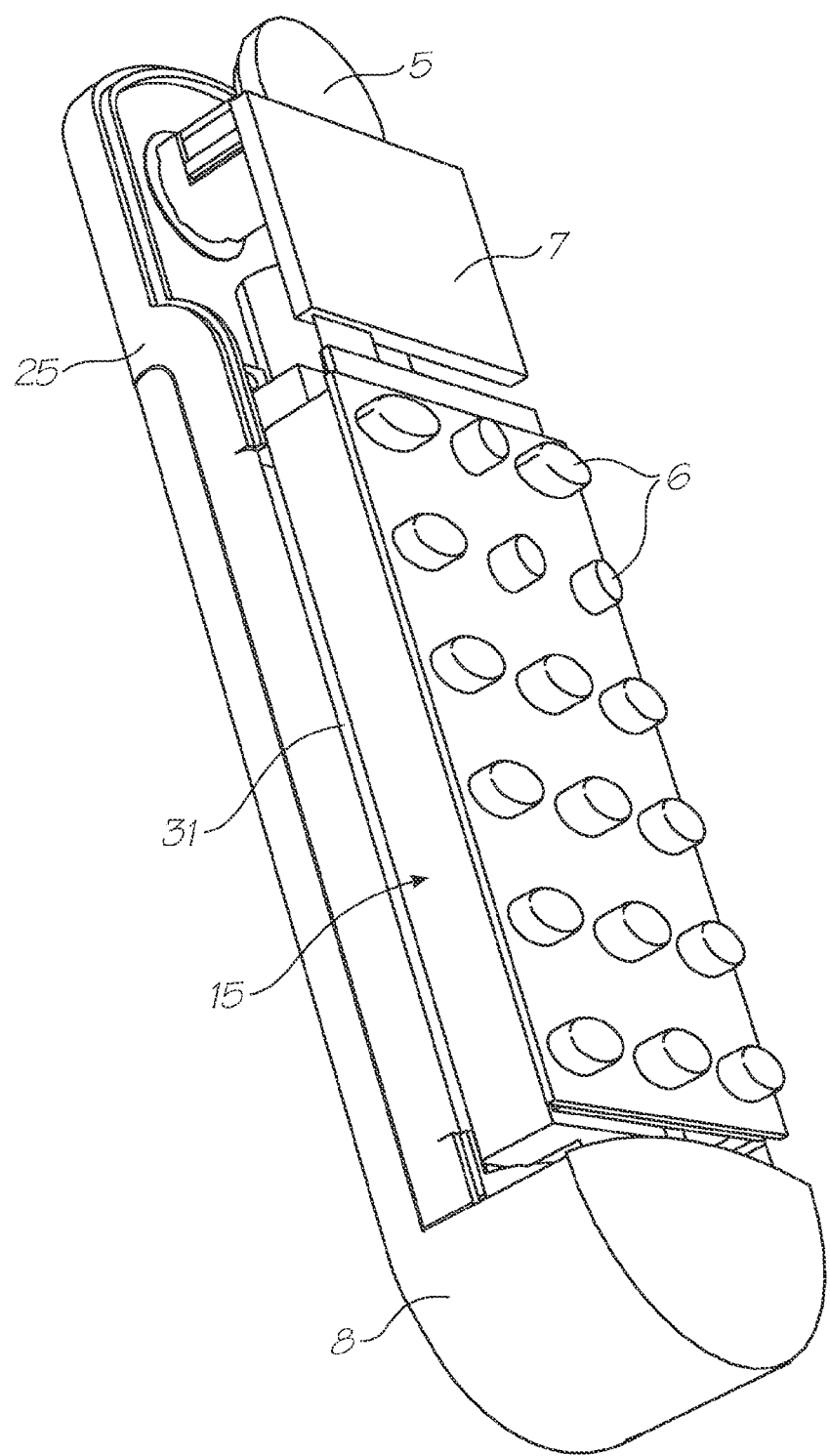
FIG. 3 is a front perspective view as shown in FIG. 1 with the front outer cover removed.
Figure 4:
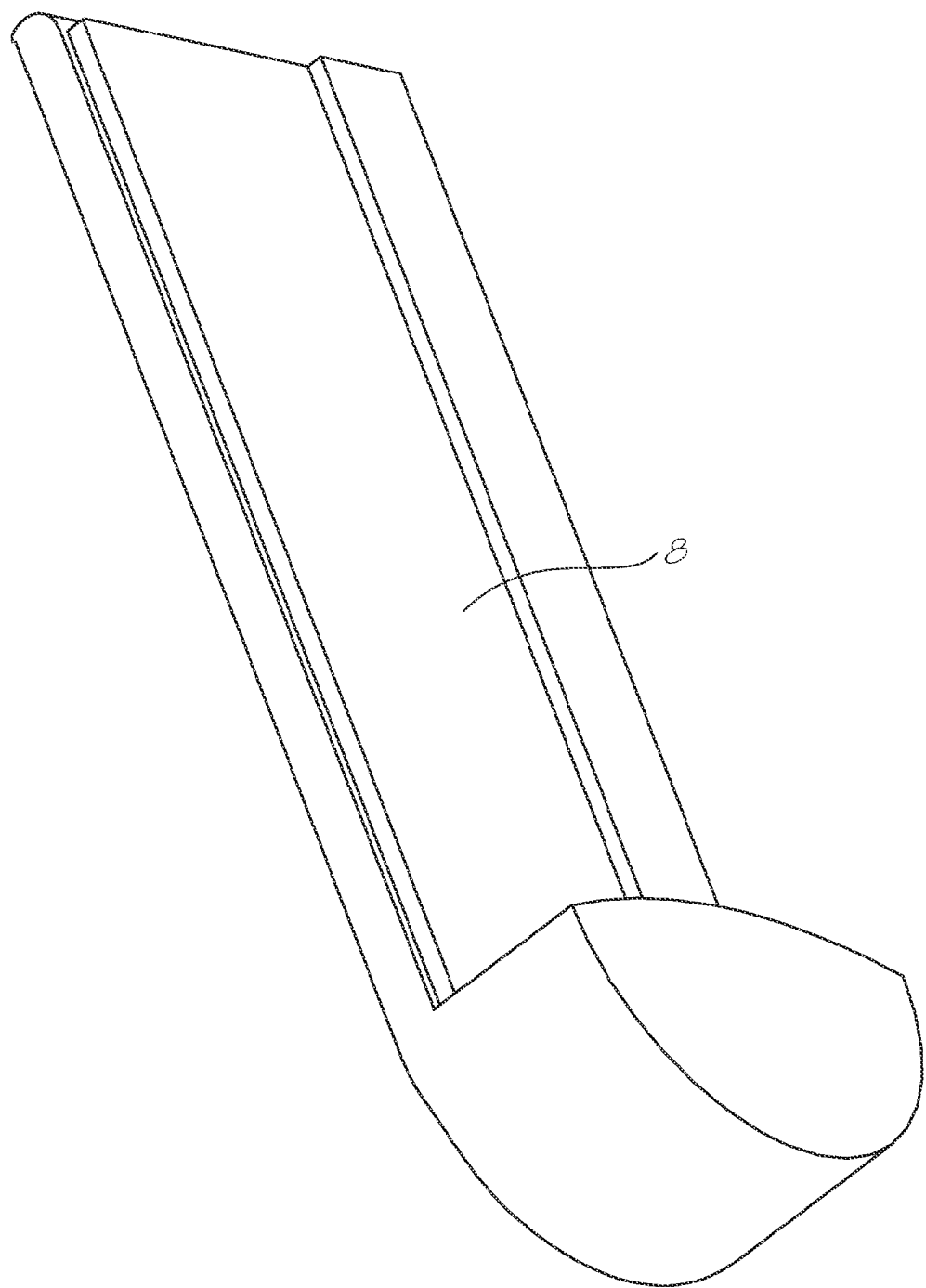
FIG. 4 is a front perspective view of the battery shown in the previous figures.

Turning initially to FIG. 1, there is illustrated the preferred embodiment 1 in the form of a PHS phone and which in many ways looks like and includes the features of a conventional mobile phone of this type including an ear piece 2, microphone 3, aerial 4, loud speaker 5, a series of push buttons 6 and a preferably color LCD screen 7 for the display of information. Also included is a battery 8 as shown in FIG. 4.

The phone 1 can optionally be equipped with a camera device 10 comprising lenses 11 and associated CCD chip or CMOS sensor 12. The CCD or CMOS sensor enables the device to store images on demand, so that the phone can effectively act as a camera device for the printing out of images, or for their capture and forwarding across a mobile phone network. The operation of the relevant part of the internal control electronics can be substantially as set out in the applicant's earlier PCT application WO 99/04551 entitled "A replenishable one time use camera system" the contents of which are incorporated herein by reference. In other embodiments, the camera device may also be configured to enable video conferencing by facilitating simultaneous image processing during phone transmission. A camera function that is mounted for selective movable positioning on the phone device may be useful for this purpose. For example, it may be rotatable between a forward facing camera orientation and a rearward facing video conferencing orientation.

The printer apparatus is shown generally at 15 and comprises a printhead and ink supply module 16 including a printhead 17, an ink supply/distribution unit 18 and a print media feed apparatus 20. The feed apparatus is of a conventional form including a motor 21 with associated gear train 22 which drive a series of feed rollers 23.

Figure 5:
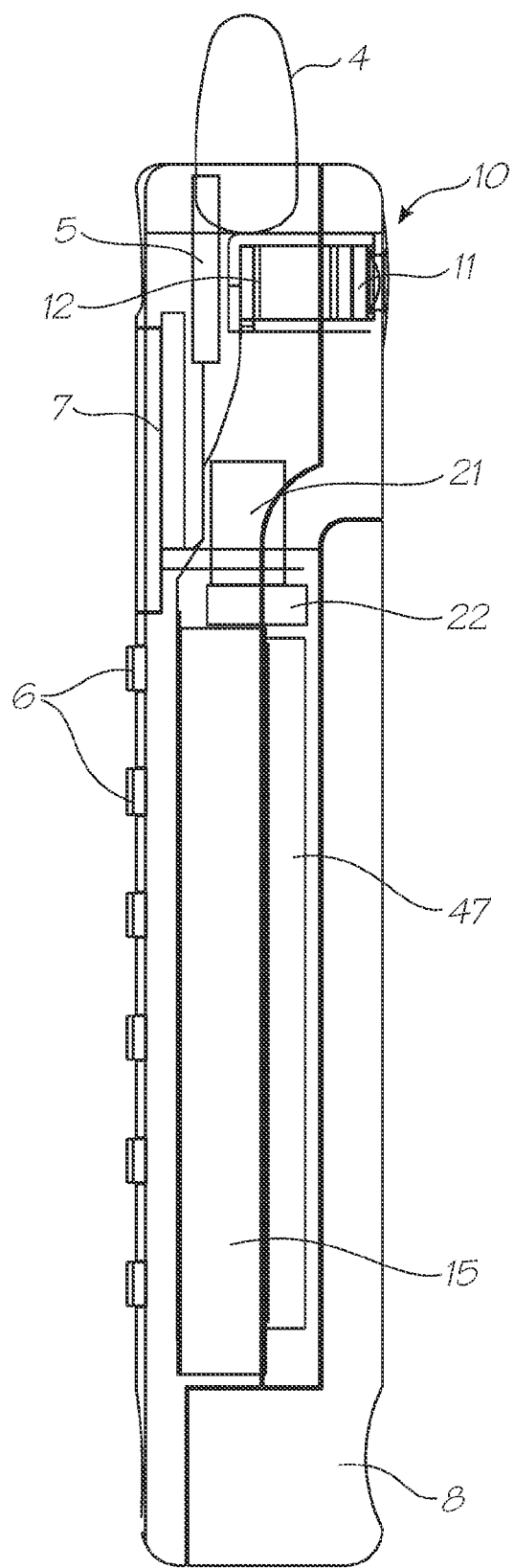
FIG. 5 is a layered sectional right hand side view of the printer phone shown in the previous figures.
Figure 6:
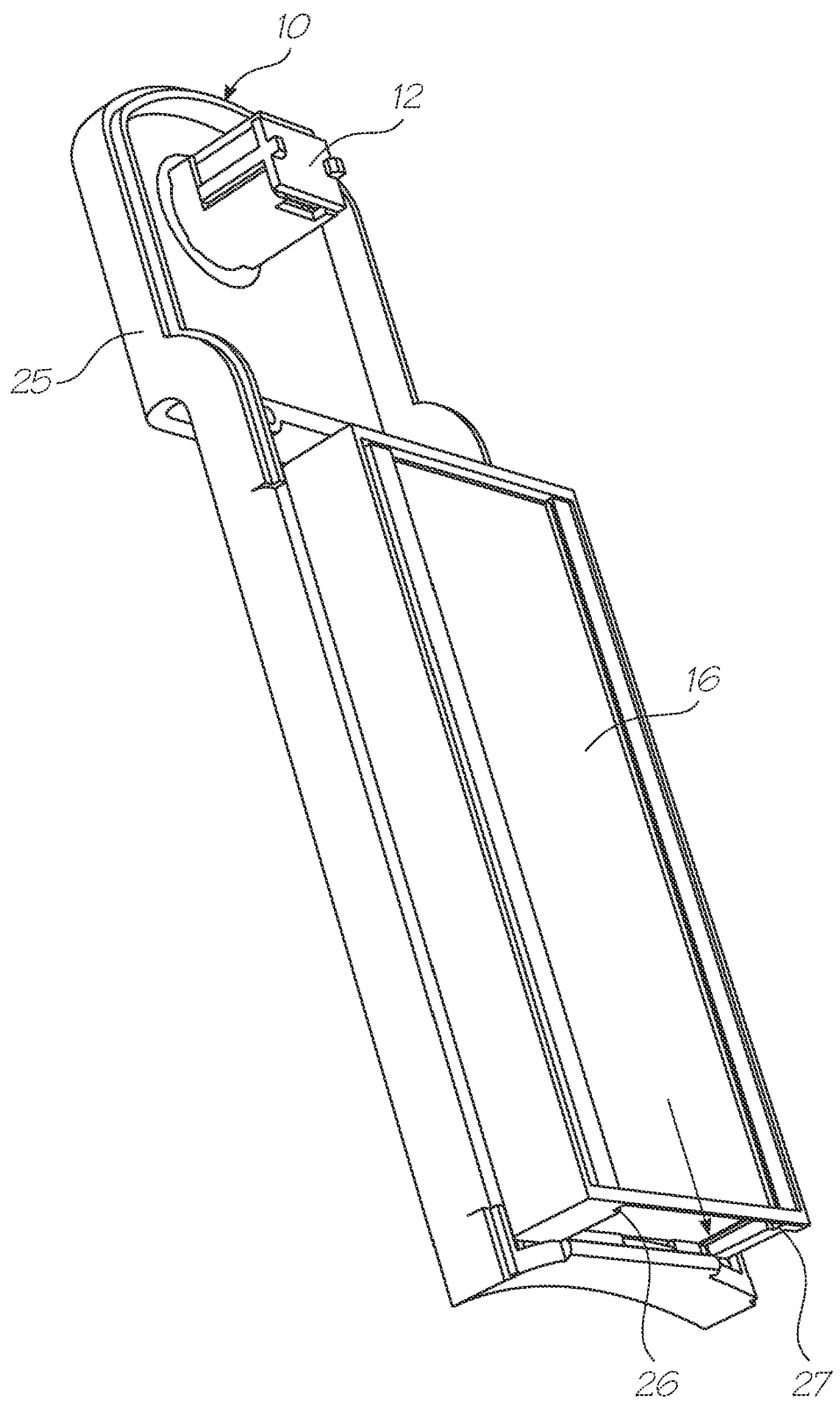
FIG. 6 is a front perspective view of the printer phone sub-chassis and printhead/ink supply module.
Figure 7:
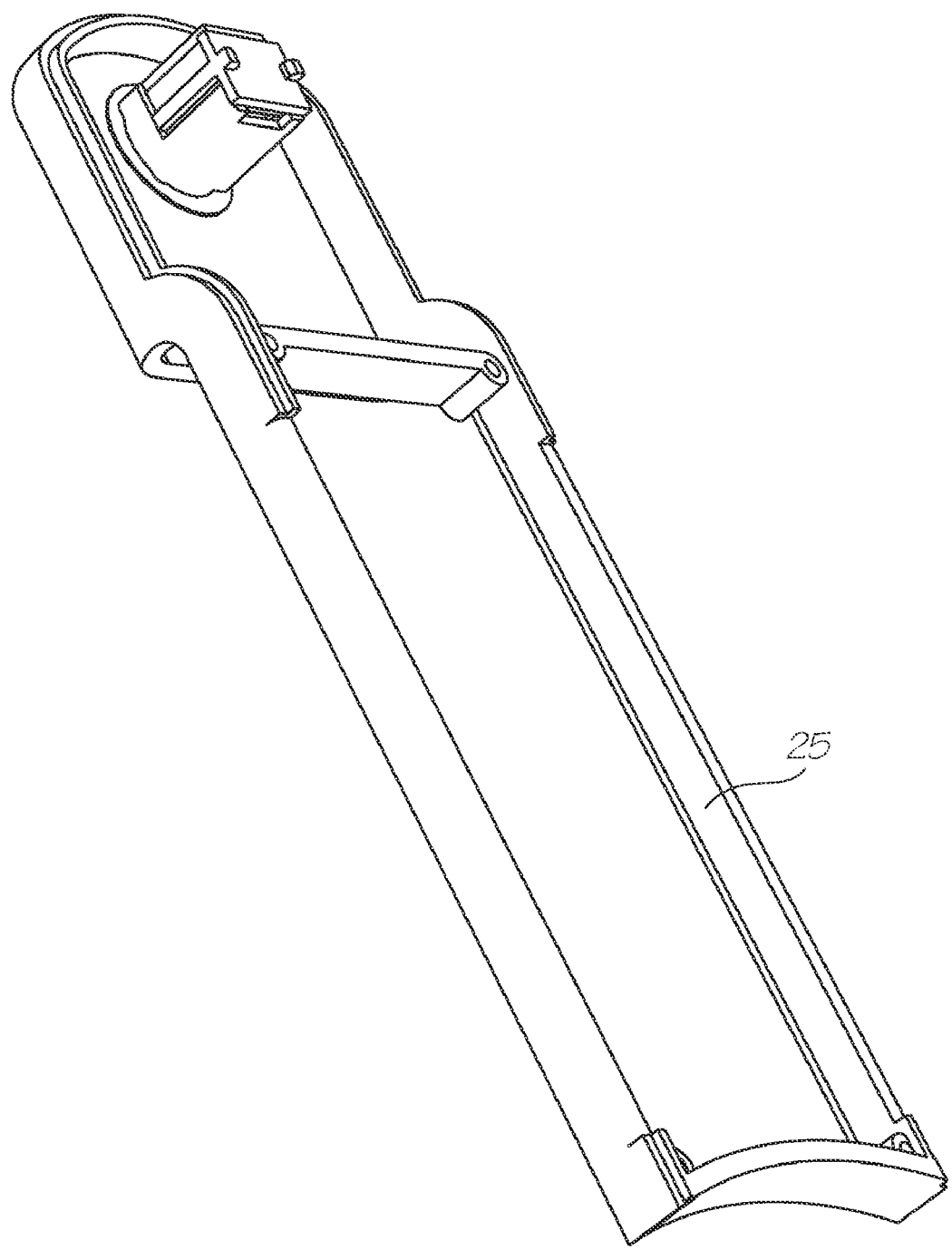
FIG. 7 is a front perspective view of the support chassis shown in FIG. 6.
Figure 9:
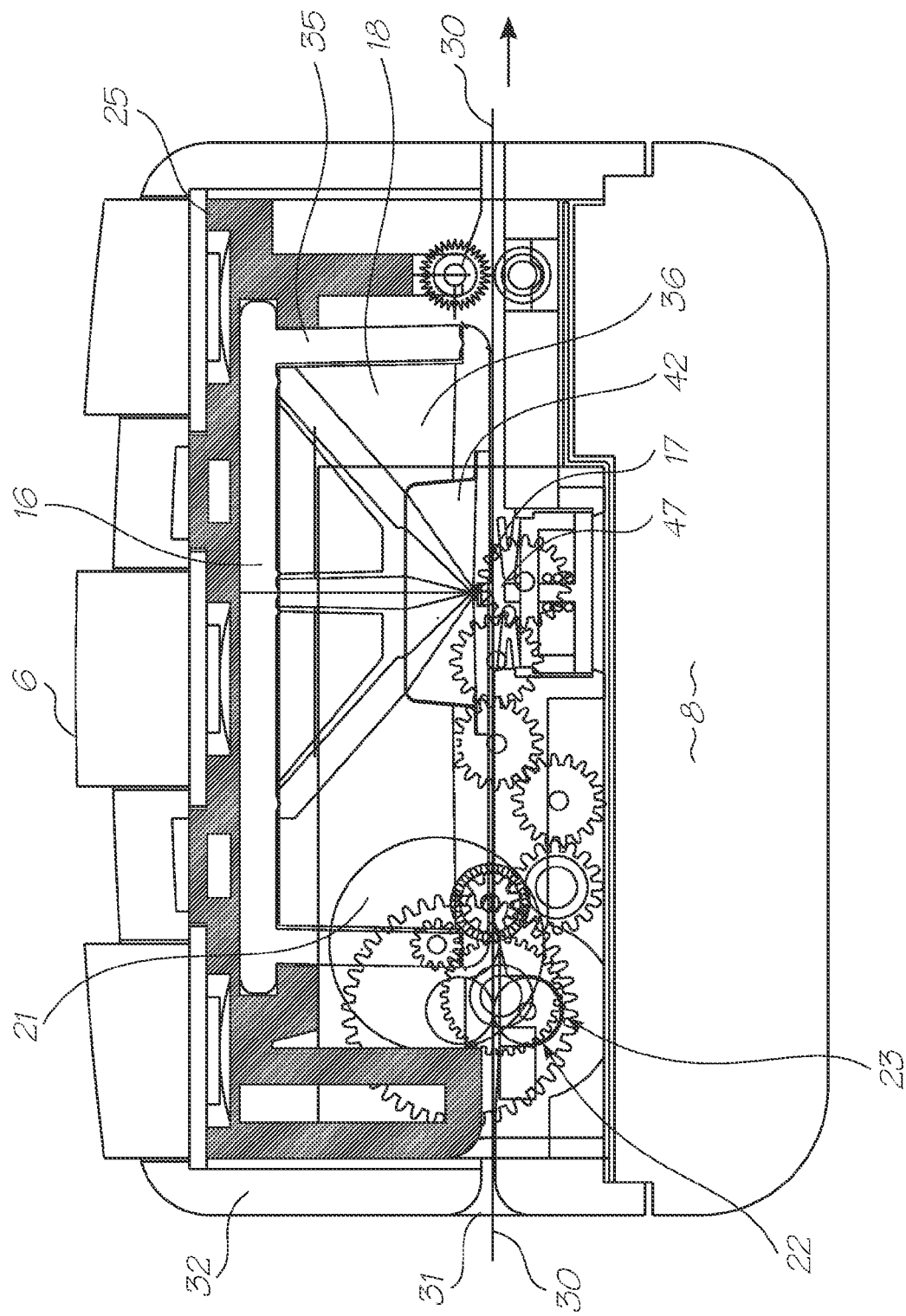
FIG. 9 is a transverse section through the phone unit and printhead/ink supply module.
Figure 10:
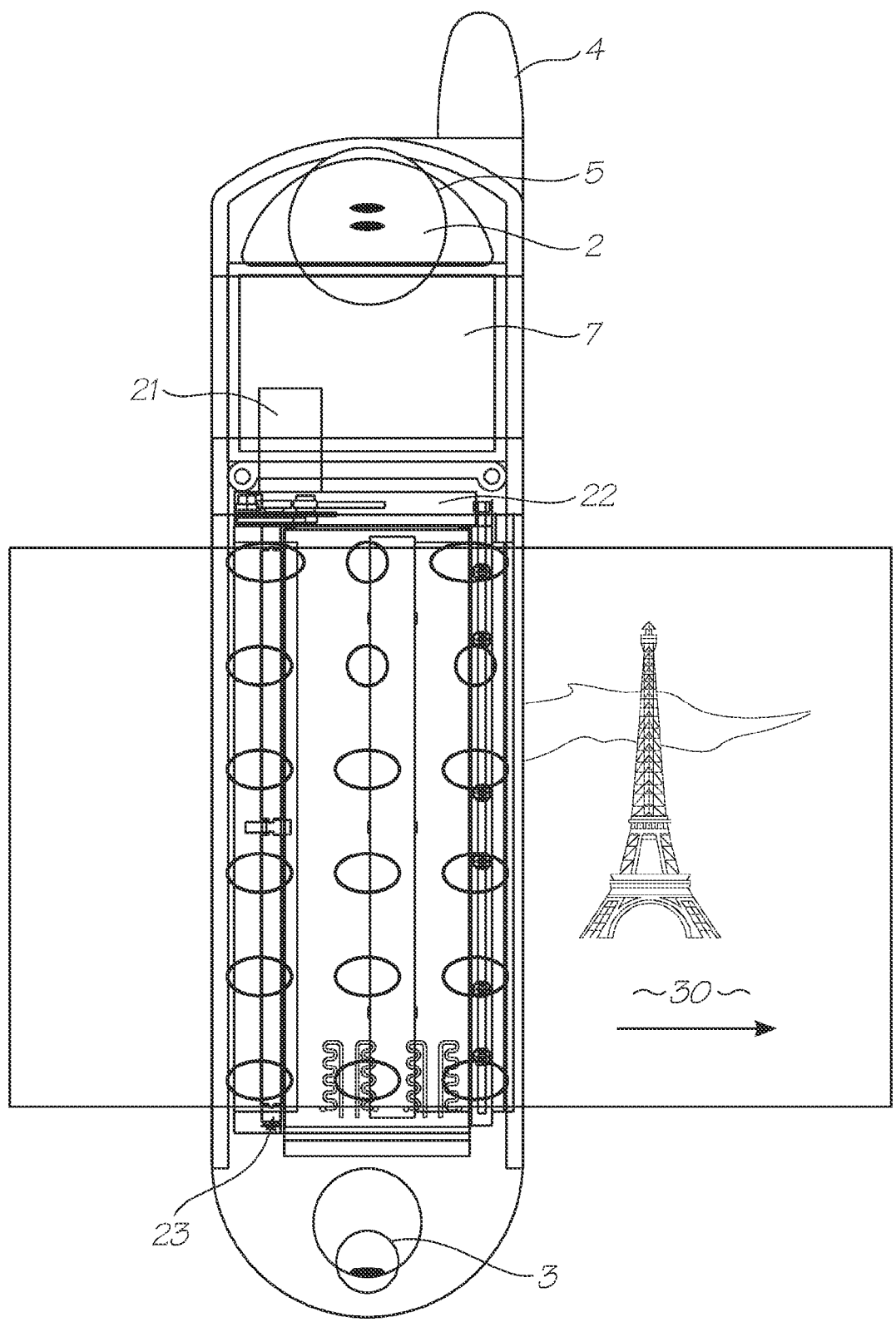
FIG. 10 is a front layered sectional view of the printer phone of the previous figures.
Figure 11:
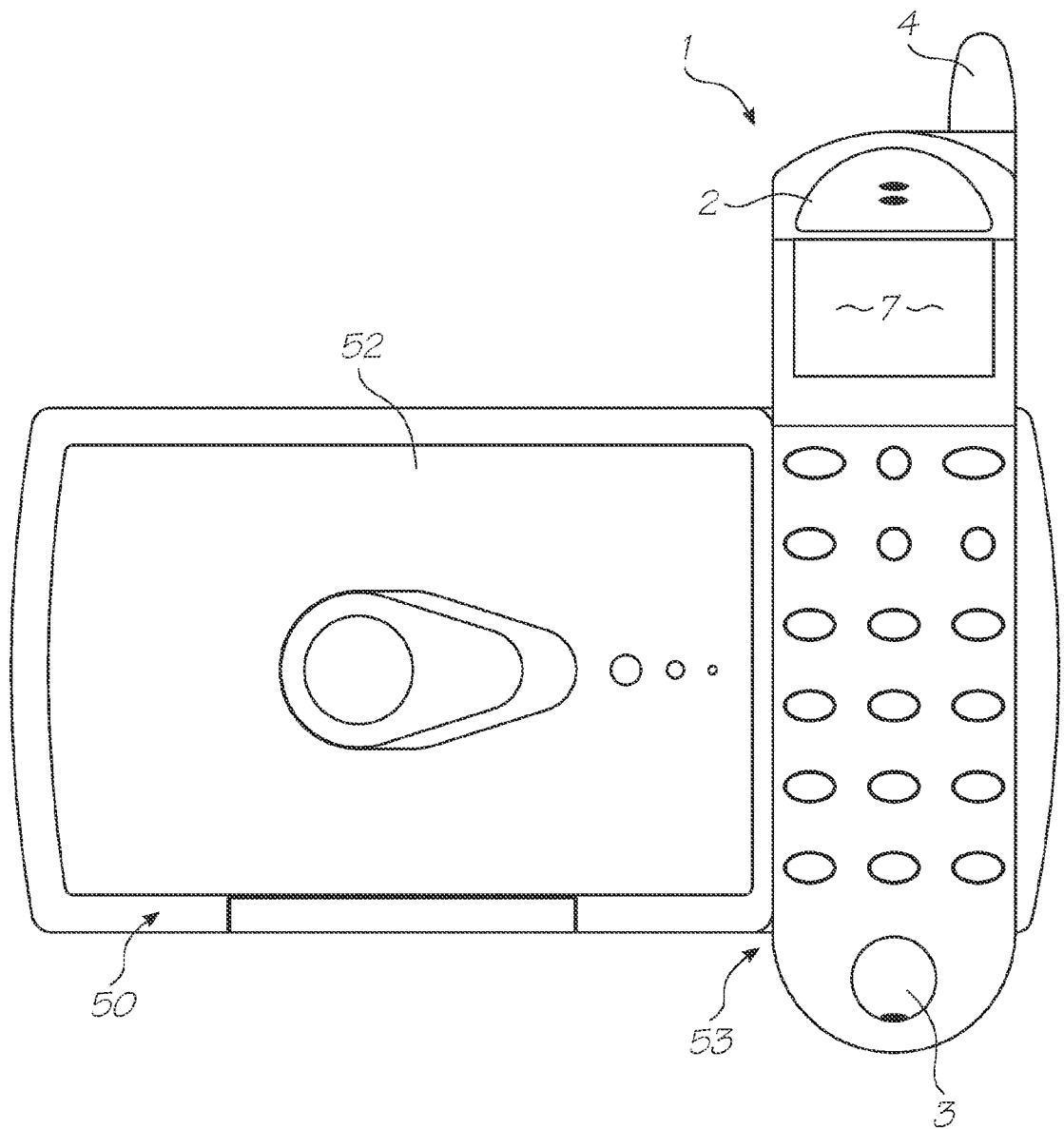
FIG. 11 is a plan view of the phone of the previous figures attached to an associated print media-dispensing device.
Figure 12:
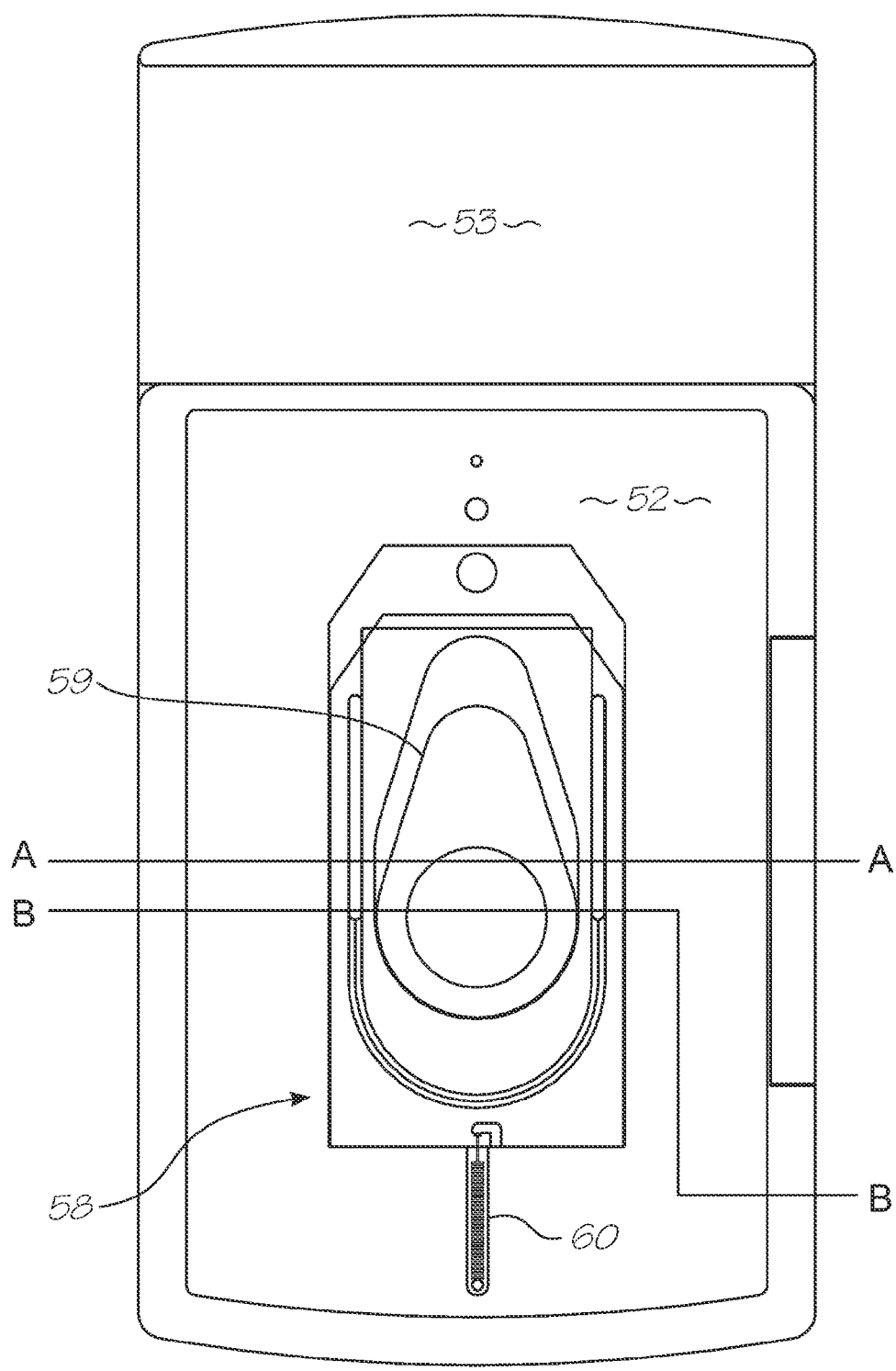
FIG. 12 is a plan view of the print media-dispensing device shown in FIG. 11.
Figure 13:
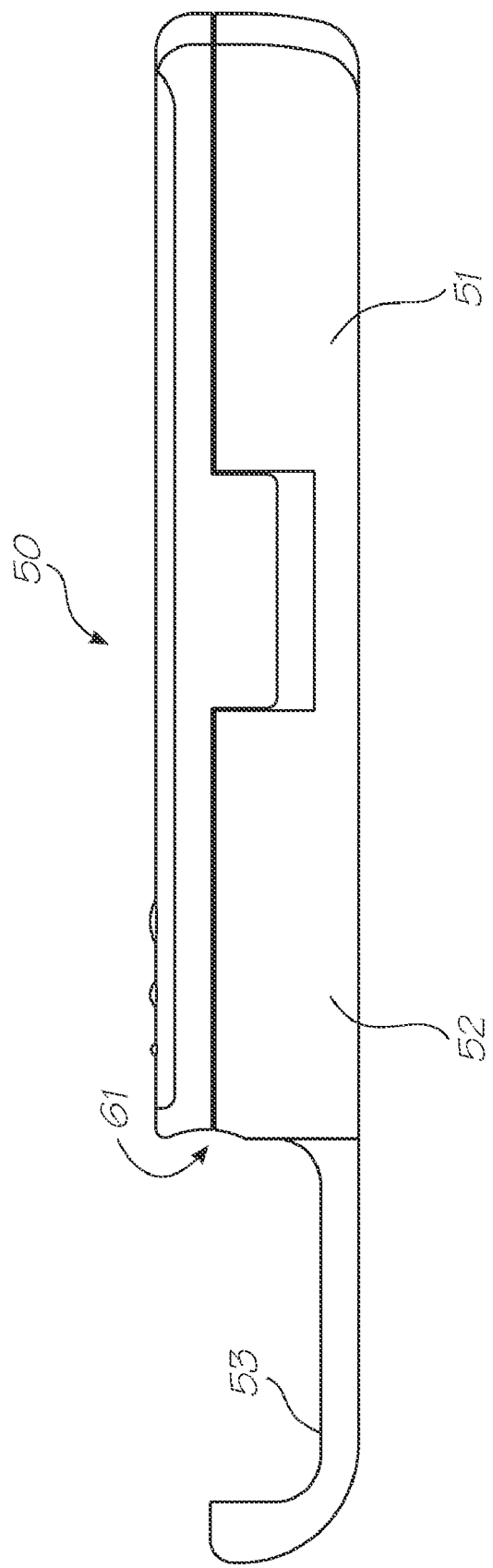
FIG. 13 is a left-hand side view of the print media dispenser shown in FIGS. 11 and 12.

The packaging of the printer apparatus 15 is best shown in FIGS. 5, 6 and 9. In this regard the printer phone 1 is constructed around a rigid chassis molding 25. The chassis is adapted to slidably receive and retain the printhead and ink supply module 16 by means of retaining flanges 26 provided on the outer casing of the printhead and ink supply module 16 which co-operate with under cut channels 27 provided on the chassis molding.

The full operation of the printer apparatus 15 is best illustrated in FIG. 9. In use print media 30, preferably in the form of business card sized paper or card sheets, is fed in through an entry slot 31 provided in the external phone casing 32. This can be done manually or via a dispenser as described hereafter. The card 30 is then picked up by the powered entry feed rollers 23 and delivered to the printhead and ink supply module 16. The printhead and ink supply module 16 can be substantially the same as that disclosed in Australian Provisional Patent No. PP6534 filed 16 Oct. 1998 (U.S. Ser. No. 09/425,419 filed 19 Oct. 1999), the contents of which are also hereby incorporated by cross-reference. In such a device, the printhead is in the form of an elongate printhead chip that extends the full length of the print media pathway, so as to print the full width of the print media in a single pass without the need for any printhead traversing mechanisms.

Figure 8:
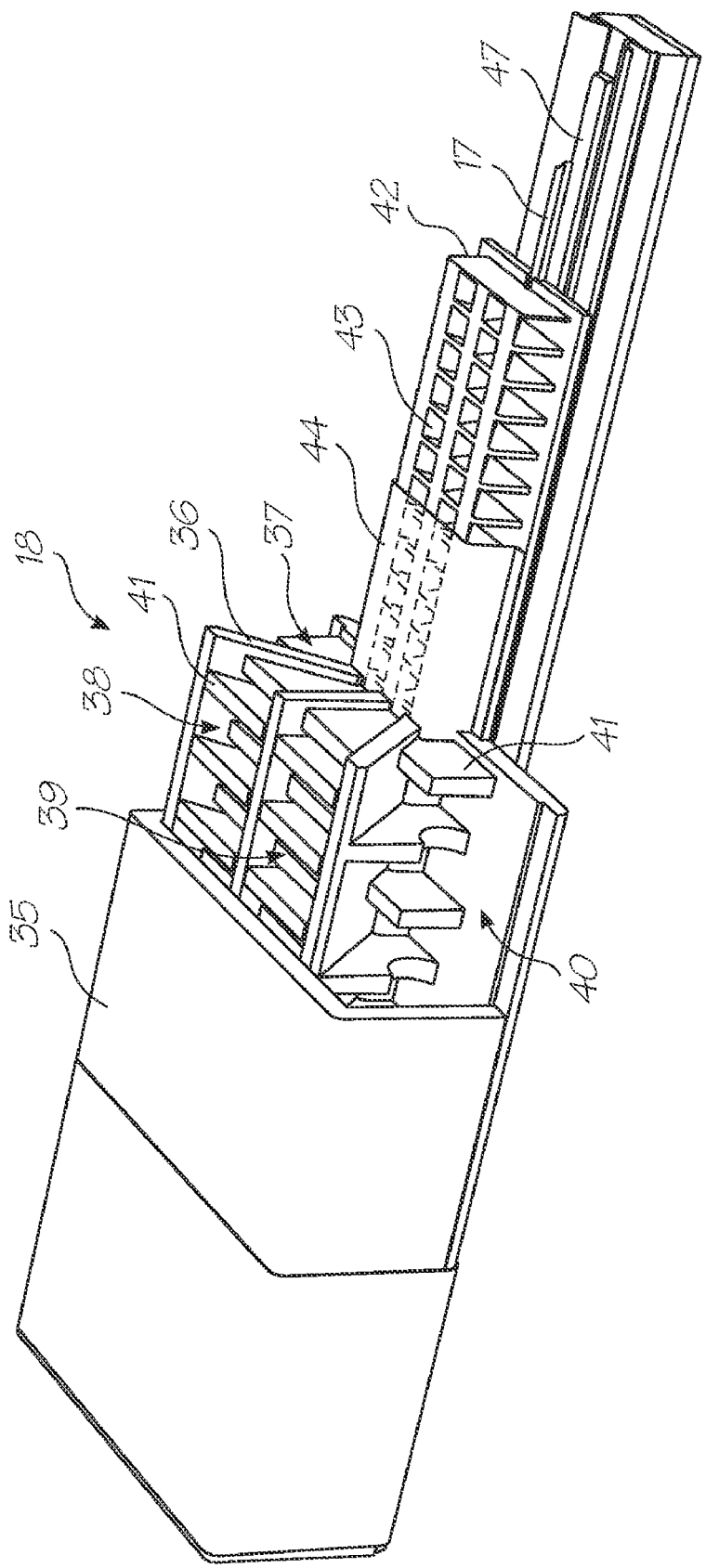
FIG. 8 is a part sectioned front perspective view of the printhead and ink supply module shown in FIG. 6.

In this particular preferred embodiment, the printhead and ink module is formed as a sealed unit which is replaced in its totality after a predetermined amount of usage. The detailed structure of the ink supply and printhead module is shown more clearly in FIG. 8. The ink supply/distribution unit 18 is of a molded multi-part structure including a cover 35, a macro channel molding 36 defining four separate ink supply chambers 37-40 having therein optional flow control baffles 41. Connected with converging outlets of the macro channel molding 36 is a micro-molding 42 which defines similarly converging ink flow nozzles 43 that accurately direct the ink to minute ink supply inlets on the rear of the printhead 17. Optionally, an ink filter 44 is provided between the two moldings. A capping device 47 is also provided as part of the module for sealing and protecting the nozzle outlets when the printer head is not in use. It is estimated that the ink supply will on average be sufficient for printing approximately 1000 pages at 15% coverage of black or 100 photos of 50% coverage of CMYK. An expanded technical description of the printhead and ink supply module can be found in the aforementioned provisional patent specification PP6534 and associated applications.

Figure 16:
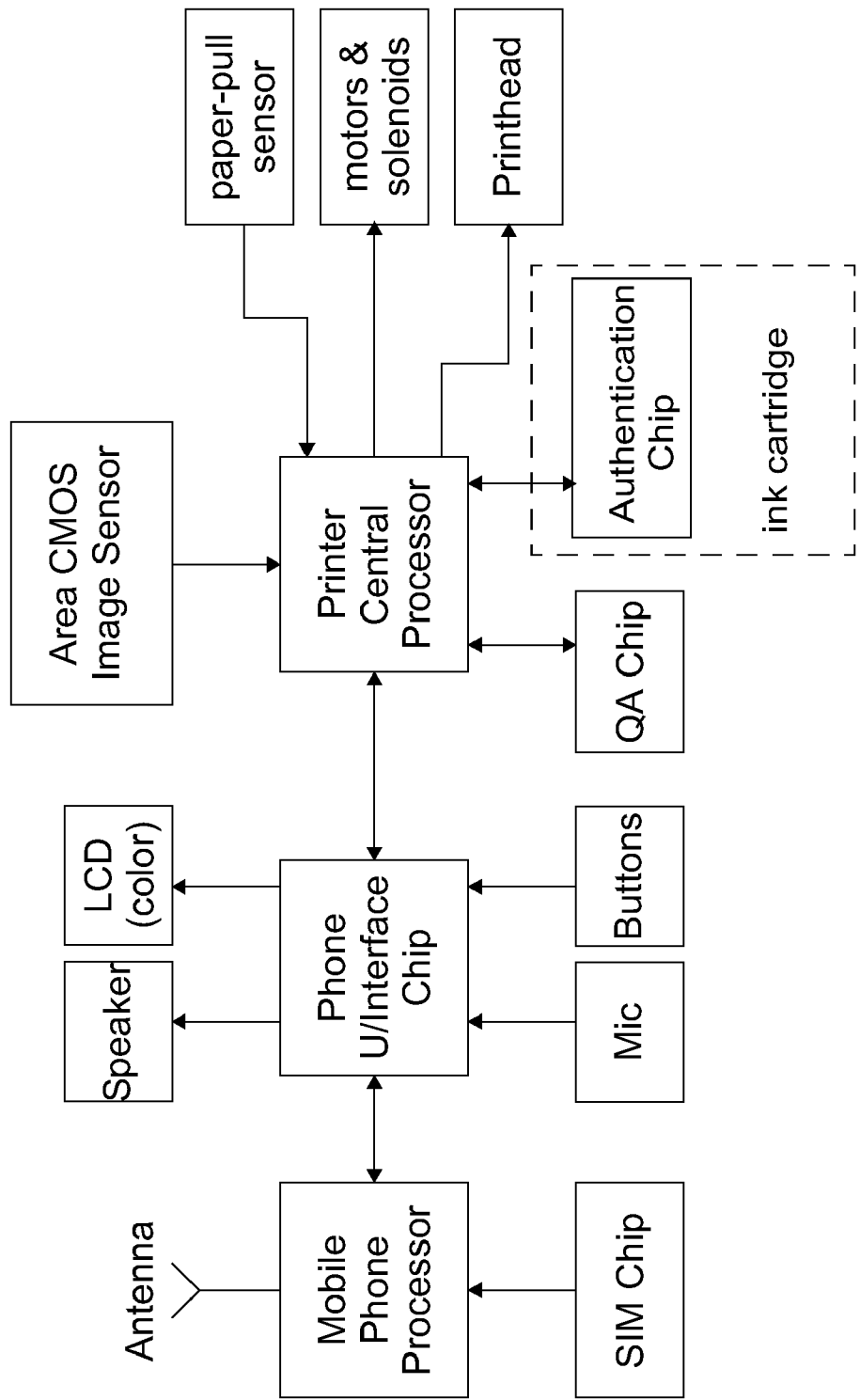
FIG. 16 is a schematic block diagram showing the electrical interconnections.

The mobile phone system can be operated under the control of a series of one or more application specific integrated circuits (ASICS) which incorporate the usual mobile phone capabilities in addition to camera and image processing capabilities. An adaptation of the system outlined in PCT Patent Application PCT/AU98/00544 filed by the present applicant (also incorporated herein by reference) can be utilised in the design of the ASIC. The electrical interconnections for the preferred embodiment are shown schematically as a block diagram in FIG. 16. Other system designs well known to those skilled in this field may also be used.

Referring next to FIGS. 11 to 15 there is illustrated a print media dispenser 50 configured for use with the PHS phone of the previous embodiments. The dispenser comprises a lower molding 51 that defines a media storage and dispensing region 52 and a cradle 53 which supports the printer phone 1 and aligns it with the outlet of the dispenser.

Figure 14:
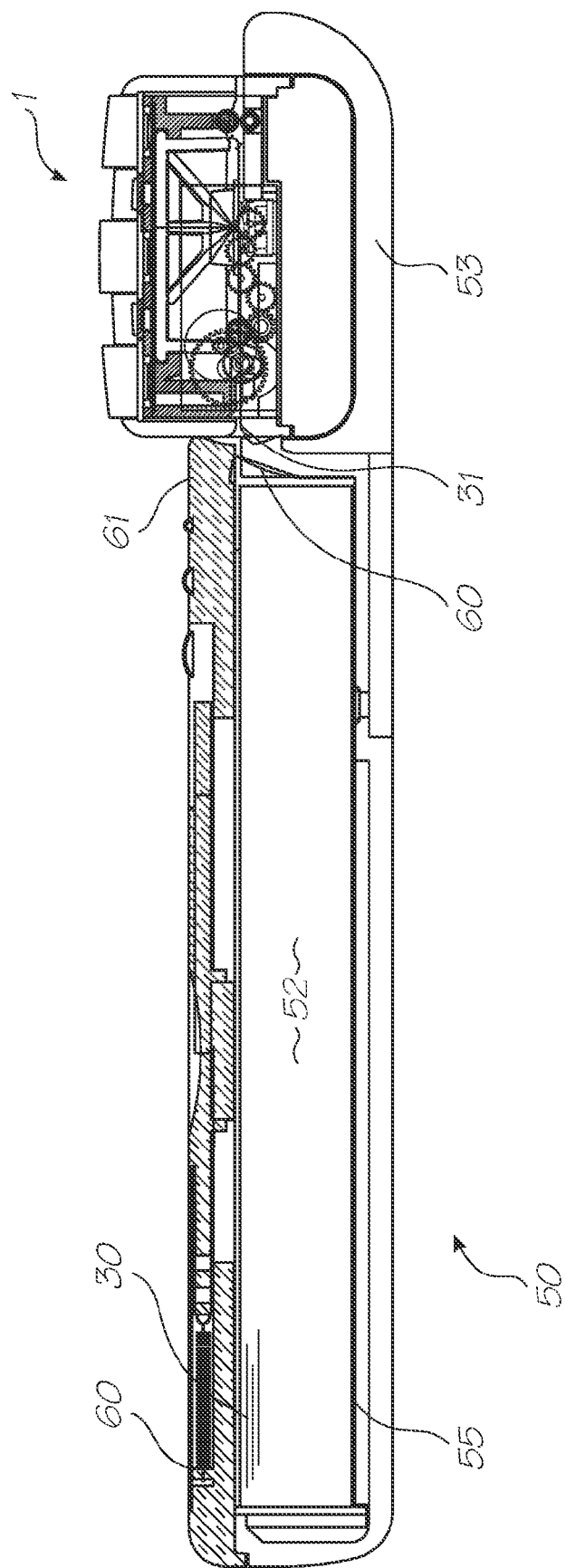
FIG. 14 is a sectional right hand side view of the print media dispenser shown in FIG. 11.
Figure 15:
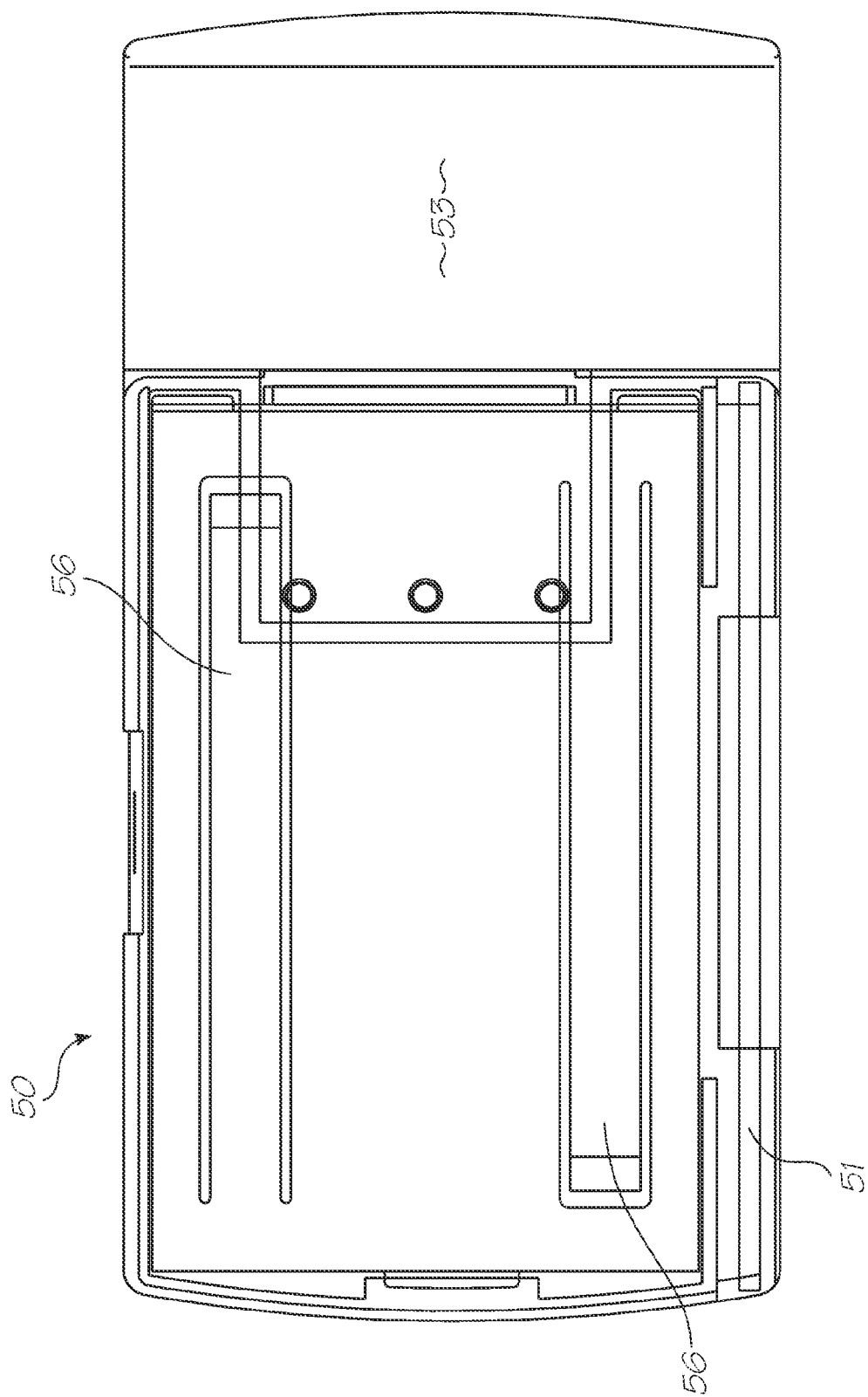
FIG. 15 is a plan view of the print media dispenser shown in FIG. 11 with the upper portion of the casing removed.

The interactive operation of the print media dispenser with the phone 1 is best illustrated in FIG. 14. As can be seen, the dispenser 50 has a storage area 52 in which is disposed a quantity of print media in the form of business card sized paper or card sheets 54. These cards are supported on a metal base plate 55 which is sprung by means of opposed spring fingers 56 as shown in FIG. 15. In this manner, the card supply is constantly biased upwardly toward a media ejector mechanism 58. The ejector mechanism includes an ejector slider 59 which is operable upon manual sliding against a return spring 60 to pick up the top card and feed this out of the dispenser outlet 61 and into the media entry slot 31 on the phone 1. On release, the slider automatically returns to the home position to engage the next card ready for further loading.

Desirably, the printer phone 1 and/or printhead and ink supply module 16 includes an authentication mechanism such as that outlined in the applicant's earlier PCT application no. PCT/AU98/00544 entitled "A camera with an internal printing system". This can be used to ensure not only that an authenticated approved consumable (such as the printhead and ink supply module) is used with the printer phone, but can also be used to store data on the relative usages of the consumable components such as the ink or the printhead itself and can optionally be used to set a predetermined usage for these items.

As noted above, the phone device of the invention may be any kind of mobile phone that sends and receives signals in a manner which can be processed into a printable form. Further, while the preferred form described has a printhead and ink distribution unit which has an integrally formed and attached ink supply, the ink supply could be separate and optionally also separately replenishable.

While the invention has been described with reference to specific examples, it will be appreciated by those skilled in the art that the invention may be embodied in many other forms.

I claim:

1. A mobile telephone comprising:
    a support structure around which the mobile telephone is constructed;
    a camera device positioned on the support structure for electronically capturing and processing an image;
    a detachable printing mechanism; and
    a receptacle, defined in the support structure, for receiving therein the detachable printing mechanism, wherein
    the detachable printing mechanism defines therethrough a print media feed path along which print media is fed for printing, the print media feed path extending from a first longitudinal side of the support structure through to a second longitudinal side of the support structure opposite the first longitudinal side.

2. A mobile telephone as claimed in claim 1, wherein the detachable printing mechanism includes a pagewidth printhead and an ink distribution unit mounted on the printhead to supply ink to the printhead.

3. A mobile telephone as claimed in claim 2, wherein the printhead includes a printhead integrated circuit that transversely spans the print media feed path, the printhead integrated circuit defining a plurality of ink inlets for the supply of ink to the printhead integrated circuit.

4. A mobile telephone as claimed in claim 3, wherein the ink distribution unit defines a number of discrete ink supply chambers and a plurality of ink pathways interposed between the ink supply chambers and said ink inlets, the ink pathways converging towards the ink inlets so that each ink inlet is supplied with ink from a respective ink pathway.

5. The mobile telephone as claimed in claim 1, wherein the receptacle is adapted to slidably receive the detachable printing mechanism.

* * * * *